A. R. SMITH.
CAR RECORD.
APPLICATION FILED OCT. 24, 1914.
1,268,889. Patented June 11, 1918.
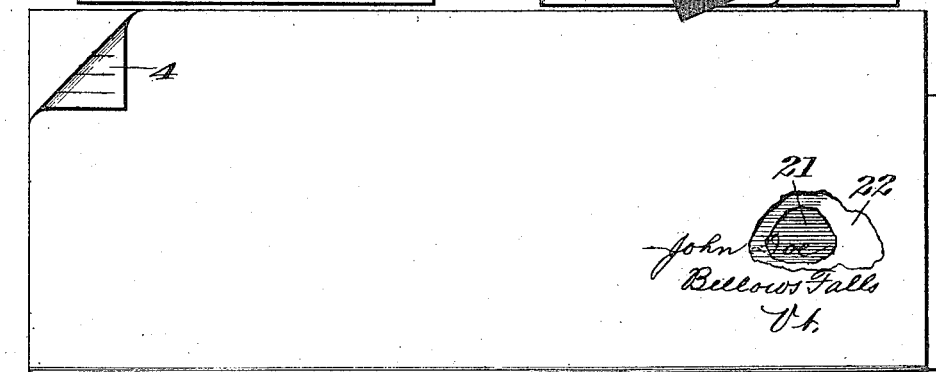

UNITED STATES PATENT OFFICE.

ALBERT R. SMITH, OF BELLOWS FALLS, VERMONT.

CAR-RECORD.

1,268,889.  Specification of Letters Patent.  Patented June 11, 1918.

Application filed October 24, 1914. Serial No. 868,497.

*To all whom it may concern:*

Be it known that I, ALBERT R. SMITH, a citizen of the United States, residing at Bellows Falls, in the county of Windham and State of Vermont, have invented a certain new and useful Improvement in Car-Records, of which the following is a full, clear, and exact description.

Movements of freight and other cars by railroad companies have to be recorded in detail by station agents and others, and many blanks, in sheet and book form, are used for making these records, singly and in multiple, including duplication to a large extent and the consumption of much time and labor. Details of such movements are necessary not only in the operating departments, but in the accounting departments as well. Frequently in the settlement of claims made by consignors and consignees, these records must be produced in court, and in those cases where the records are in book form containing the records of many cases other than that in dispute, the railroad companies and their agents are deprived of the convenient use of these books while in the custody of the courts, so that they are subjected to great inconvenience and delay in the transaction of business with other patrons.

The present invention is designed to simplify the keeping of such records, and to make them singly or individually available in the settlement of claims, and generally to improve the system of car records by the use of a loose leaf or individual form, on which the entries are appropriately classified, and which may be made in duplicate, or wholly or partly in multiple, so that the agent at the point of departure may obtain a record of car movements and advise the agent at the point of destination, or elsewhere, and obtain an orginal for the main office without resorting to the duplications or repetitions commonly employed at present.

The invention consists of a car record constructed and arranged to meet the foregoing and other requirements of railway operation as I will proceed now to explain and finally claim.

In the accompanying drawings illustrating the invention, in the several figures of which like parts are similarly designated, Figure 1 is a plan view, on a reduced scale, showing a blank by which all of the record made at one time may be obtained in part in triplicate. Fig. 2 is a similar view with the first sheet partly turned over and broken away at one corner, exposing the duplicate sheet beneath and the postcard blank for obtaining part of the original record, and a carbon sheet by which also the address on the back of the copy sheet may be impressed upon the postcard. Fig. 3 is a reverse view, showing the address and parts broken away to indicate the impressing of the address on the intermediate postcard.

Without thereby limiting the invention to such form, I will proceed to describe it as illustrated. The drawing may represent a blank for a folder, and, for example, eleven by four and a half inches in size, ruled and printed to contain the necessary or desired entries concerning a freight car from any given point to another or to ultimate destination. The printed matter may be small enough to leave room on each blank space to receive the manuscript matter, or this printed matter may be of such character and so disposed in the spaces that it may be written over in manuscript without obliterating or concealing it, or otherwise rendering it illegible, and without interfering with the legibility of the manuscript matter. The transverse space 1 at the top is to receive the name of the railroad company using the form. This space is delimited by a transverse line or lines 2, and near the bottom of the blank is another delimiting line 3, leaving at the bottom of the blank a space 4 which may be left blank, or may be ruled to receive, as indicated in the title, any data not specifically provided for in the ruled portions intervening between the top and bottom. A main longitudinal heavy or black face line 5 divides the space between the top and bottom into two main divisions of unequal width, and these two main divisions are subdivided by the transverse lines 6.

As indicated, the division 7 bounded by the left-hand edge of the blank on one side and the longitudinal line 5 on the other and the lines 2 and 6, is ruled off into appropriate spaces with a printed key destination to indicate the ownership or shipping point of the car, and the "kind," "initial" and "number" of the car. Next following below is a space to receive manuscript data as to whence the car was "transferred;" next following are spaces on the same line for the name of the station issuing the record and the date; next following below is a space to contain the name of the consignee, and another subjacent space for a second consignee; and next below a space to receive the name of the station from which the car emanated, and next below three longitudinally separated spaces on the same line to receive data as to the "contents" and "weight" of the car and the railroad "charges" on the same; and next below four more or less spaces, the last of which is divided longitudinally for information as to the "consignor" and the "contents" and "weight" of the car. Following down on this side of the form is a division 8 ruled transversely and longitudinally into two sub-divisions separated by a heavy line 9, in which data as to incoming (In) and outgoing (Out) cars may be noted, and these two columns have arranged below them longitudinally and transversely divided spaces for data as to the railroad transporting the car and the consignee for both the incoming and the outgoing car, and below this are longitudinally and transversely ruled spaces for data as to charges for car service (C. S.), and for switching (SW), for ferry (F.), for credit (Cr.), to apply on unloading a car in accordance with average agreement rules in force by railroads, and debit (Dr.) on the same account, and finally for notation of any excess (Ex.) charges.

To the right of the main longitudinal division line 5 and between lines 2 and 6, "date," "time" and "train" number spaces 10, 11 and 12 are provided in one transverse block for incoming (In) and outgoing (Out) cars, and for recording the time of gross detention ("Gross det'n") of a car. Below these blanks is a main space 13 for the reception of numbers from the "check sheet," when the forms are used for warehouse records. As indicated, this space is ruled transversely and divided into two longitudinal columns 14 and 15 under "In" and "Out" for incoming and outgoing cars, with a third parallel column 16 containing the printed item "Straight demurrage," "Average agreement," "Public delivery," and "Private sidings," and also the character of the contents of the car, whether "inflammable," "explosive," "acid" or "perishable," and at the foot of the name column a space for "rush order" when the car is to be so forwarded. All these items as used are to be noted in manuscript in columns 14 and 15.

Next below is a transverse space 17 indexed "Carded" to receive notice of advice by postcard to consignee, and used to complete the data in the spaces at the left.

Next below are two longitudinal columns 18 and 19, the spaces in which are to receive appropriate marks corresponding to the printed matter therein. The various items of printed matter would seem to be self-explanatory, only two of them requiring definition, namely:—"Cons'ctive" meaning "constructive" and "C N" standing for "correction."

The blank form may be used with loose carbon sheets for obtaining carbon copies in any usual way, and to any desired extent; or when the form is made as a folder, the front sheet may have its back carbonized for copying purposes, as indicated at 20 on the turned over portion, Fig. 2. Furthermore, in order to meet the requirements of postcard notification, a postcard 21 having on it ruled spaces with proper indicia corresponding with a portion of the record sheet sufficient to identify the particular car for which the sheet is used, as shown in Fig. 2, may be provided to receive a carbon copy of the entries as made, and in such case an additional carbon sheet or other carbon surface 22 may be used so as to insure the copying of the entry on the second sheet; and then, after all of the entries are made, the carbon sheet 22 may be reversed so that the address face of the card may be inscribed and simultaneously the inscription placed upon the back of the second sheet, as indicated in Fig. 3.

In some cases the back of the sheet may be left uncarbonized, and a carbon sheet placed between the record sheet and the postcard so as to duplicate on the postcard the entries being made on the record. In order to obtain upon the original sheet a duplicate of the address to be placed upon the address side of the post card, the postcard is arranged with its address-side next to the front of the original sheet with the carbon sheet interposed between the postcard and record sheet, and the address inscribed upon the rear or reverse side of the record sheet.

In order to properly position the postcard with relation to the record sheet, so that the entries and address may be placed thereon in their proper places, the upper edge of the postcard is provided with a marginal line 23, see Fig. 2, to coincide with the upper edge of the record sheet in placing the card in position to receive the entries as they are being made upon the record sheet.

The handling of freight by railroads is governed by statute law, and the railroad companies may, and usually do have, additional items respecting the movements of cars peculiar to their own accounting systems, and all of these items may be collected upon forms of the character herein set forth in a compact state, greatly facilitating and expediting the recording of the data and putting it in simple and convenient shape for subsequent handling both at the station of use and for the main office, and so that as already stated, each record is individualized and is valuable as such in case of litigation or for use outside of the office or station.

A main feature of the invention, however, in addition to the condensation and simplification of the making of the records, is that the form dispenses with a large number of forms of very much greater size, and one or more blanks in book form, and the office equipment for filing these blanks or forms is rendered very much simpler and adaptable for ready reference.

Under the facts stated, it is obvious that changes in the details of the form or blank are permissible within the scope of the invention herein disclosed and claimed, to suit changing conditions of law and local requirements and to meet special requirements of particular railroads.

What I claim is:—

1. A car record, comprising a folded sheet, having a plurality of longitudinally arranged parallel lines forming columnar divisions, a plurality of longitudinal and transverse lines subdividing these divisions into indicated spaces, one of the spaces containing a key designation whereby a car may be identified from its starting point to its destination, and other contiguous spaces to receive the particulars as to the train of which the car forms a part, the name of the place where the record is made, the name of the consignee and the name of the place from which the car was received, and other contiguous spaces marked to receive from time to time classified items as to the contents of the car and the charges incident to its transportation while *en route*, the spaces being systematically arranged in related order and the items therein identifiable with the car described in the said key designation, all of the folds of the sheet being substantially alike for duplicating the record.

2. A car record, comprising a folded sheet, having heavy conspicuous longitudinal lines dividing it into columns, transverse lines intersecting the longitudinal lines and thereby forming divisional spaces, longitudinal and transverse lines subdividing the divisional spaces into smaller spaces, the spaces having fixed headings to indicate the kind or character of data to be entered in the spaces and one of the spaces containing a key designation whereby a car may be identified from its starting point to its destination, and another contiguous space indicated to receive particulars as to the train of which the car forms a part, the name of the place where the record is made, the name of the consignee and the name of the place from which the car was received, and other spaces indicated to receive from time to time classified items as to the contents of the car and the charges incident to its transportation while *en route*, all of the folds of the sheet being substantially alike for duplicating the record, and a postcard adapted to be inserted between the folds and containing car identifying means and arranged to receive an address which is simultaneously inscribed on it and the record.

In testimony whereof I have hereunto set my hand this 20th day of October, A. D. 1914.

ALBERT R. SMITH.

Witnesses:
WARNER A. GRAHAM,
JENNIE E. HAYES.

Copies of this patent may be obtained for five cents each, by addressing the "Commissioner of Patents, Washington, D. C."

Correction in Letters Patent No. 1,268,889.

It is hereby certified that in Letters Patent No. 1,268,889, granted June 11, 1918, upon the application of Albert R. Smith, of Bellows Falls, Vermont, for an improvement in "Car-Records," an error appears in the printed specification requiring correction as follows: Page 1, line 104, for the word "destination" read *designation;* and that the said Letters Patent should be read with this correction therein that the same may conform to the record of the case in the Patent Office.

Signed and sealed this 9th day of July, A. D., 1918.

[SEAL.]

W. H. CLAY,

*Acting Commissioner of Patents.*

Cl. 11—19.